Sept. 4, 1951 M. BUDISH 2,566,652
MANUFACTURE OF FALSE TEETH
Filed Dec. 17, 1949

INVENTOR.
MELVIN BUDISH
BY
Charles R. Fay, atty.

Patented Sept. 4, 1951

2,566,652

UNITED STATES PATENT OFFICE 2,566,652

MANUFACTURE OF FALSE TEETH

Melvin Budish, Worcester, Mass.

Application December 17, 1949, Serial No. 133,528

2 Claims. (Cl. 18—55.1)

It has been recognized that in making false teeth, it is advantageous to make the teeth resemble natural teeth as closely as possible, natural teeth almost always having imperfections, discolorations, striations, etc., and it will be seen that it would be fairly simple merely to mold false teeth of a single suitable material, but that it is a completely different and more difficult proposition to provide the same with discolorations, striations and transparent tips as natural teeth almost always have, without making the teeth substantially by hand and individually.

It is the principal object of the present invention to provide means and method for the manufacture of false teeth having transparent tips and striations in a simple, quick and inexpensive manner so that the resulting teeth are very natural in appearance but do not cost any more than ordinary false teeth which do not imitate natural teeth as to imperfections.

A further object of the invention includes the provision of a three-piece mold including a base piece having cavities molding the rear or lingual aspects of the teeth; a second "trimming" die piece which is used to mold the teeth as a first step, said trimming die molding the labial aspects and trimming off the tips so that the teeth are shorter than they will eventually appear and also at the same time molding in an outstanding rib or ridge which extends beyond the trimmed off tips; and a third and final die piece which molds the labial aspects of the teeth in final form and has cavities longer than those of the intermediate trimmer die piece, whereby after the first molding step, the intermediate trimming die may be removed, and transparent enamel material applied to the labial aspects of the preliminarily molded teeth and covering the above described ridge so that by then applying the third and final mold the transparent enamel material is molded into exact form and embeds the raised ridge of the preliminarily molded, or molded and trimmed preliminary teeth, thus resulting in an extremely natural looking tooth having a transparent tip, a complete covering of transparent enamel, and a narrow streak or ridge extending more or less centrally of the tooth to the very tip edge thereof at the transparent portion, said streak or ridge being completely embedded.

Other objects and advantages of the invention will appear hereinafter.

Reference is to be had to the accompanying drawings, in which

Figure 1:
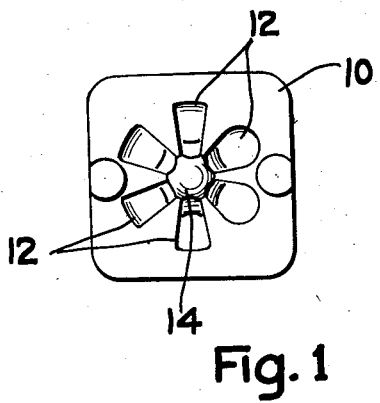
Fig. 1 is a top plan view of the first or base molding die piece.

As shown in Fig. 1, there is a die piece 10 which is provided with a series of cavities 12 and a central raised portion 14. The cavities 12 are made to represent the backs or lingual aspects of the teeth to be molded.

Figure 2:
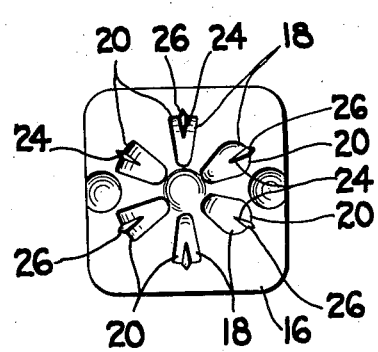
Fig. 2 is a top plan view of the intermediate or trimming die piece.
Figure 3:
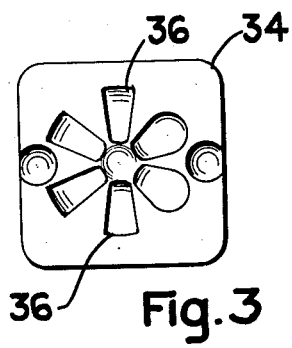
Fig. 3 is a top plan view of the final molding piece.
Figure 4:
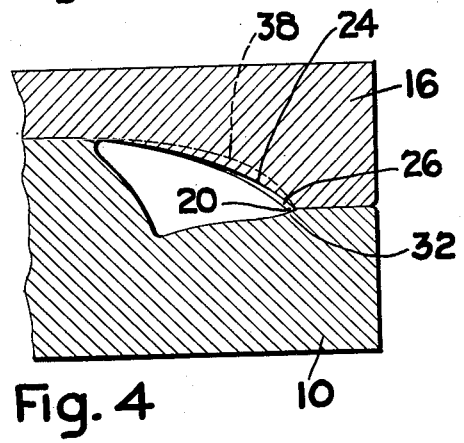
Fig. 4 is an enlarged section through the first and second die pieces when fitted together.
Figure 5:
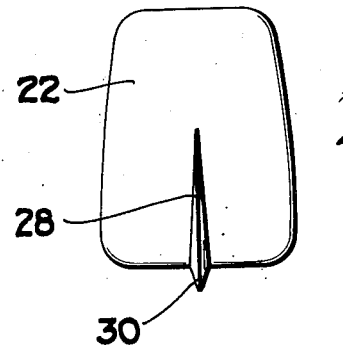
Fig. 5 is an enlarged view of a preliminarily molded tooth.

In Fig. 2 there is shown the intermediate trimming die piece 16 which is provided with a like number of cooperating cavities 18 so that when die part 16 is turned over on die part 10, it will mold the preliminary teeth. However, the cavities 18 are shorter than the cavities 12 and are provided with relatively sharp trimming edges 20 perhaps best seen in Fig. 4 which fit very slightly down into the extreme end of cavities 12 and prevent the latter from filling up with the molding material so that the resultant blank or preliminary tooth 22 as shown in Fig. 5 is shorter than the final tooth as will appear hereinafter.

At the same time the die part 16 cavities are provided with elongated central depressions 24 which extend outwardly of the cavities 20 as indicated at 26 so that the preliminary molded tooth 22 has a ridge 28 thereon and an outwardly extending ridge point 30.

The die part 16 being removed from die part 10, the so far described preliminarily molded teeth are left in the cavities of die part 10 and a transparent enamel material in plastic form is applied to the tips thereof as at 32 in sufficient quantity to extend over the entire teeth when the final die part 34 is applied thereto and pressed down thereon, and the molded material is then cured. The depths of the cavities 18 and die part 16 are a little bit less than the depth of the cavities 36 in die part 34 as well as being shorter so that the transparent enamel material spreads over the entire labial aspects of the teeth as indicated in dotted lines at 38 in Fig. 4 providing the entire tooth with an enamel surface and a transparent tip 40 which tip is more or less the same in length as the extending point 30 of ridge 28. However, it is to be clearly understood that even though the tip 40 is referred to as transparent, it is graduated to translucidity because of the shape of the molds from the biting edge upwardly and, of course, the thicker the tooth gets, the less the degree of transparency since the enamel although transparent is not glass-like but has a little color in it.

Figure 6:
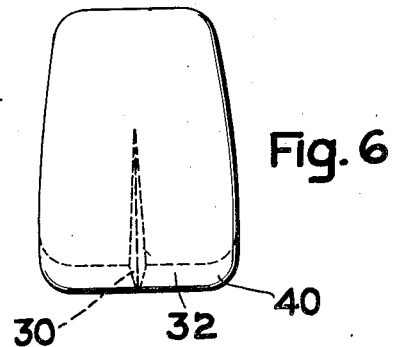
Fig. 6 is an enlarged front view of the completed tooth.

At the same time the tip 30 of ridge 28 is clearly apparent in the finished tooth in Fig. 6, but it appears to taper off upwardly as it is reduced in height toward the root of the tooth.

It will be seen that this invention provides a quick, easy and inexpensive method of molding natural looking teeth. At the same time the degree of transparency of the tip is always exactly uniform because the trimming die 16 always insures a definite relation for this tip due to the fact that it always cuts off the same amount of material at the point 20, see Fig. 4. Previously the transparent tip was applied by non-uniform manual operations, i. e., trimming off the teeth in the mold 10 with a razor blade or the like and then applying the enamel. Thus it will be seen that the intermediate mold part 16 not only renders the teeth more natural in appearance but also makes them uniform.

Figure 7:
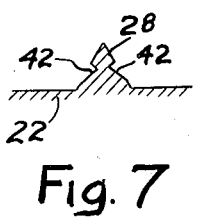
Fig. 7 is an enlarged section through a modified tooth.

In Fig. 7 there is shown an enlarged tooth 22 with the ridge 28, but in this case the ridge is undercut at 42, thus providing additional but fainter lines in the finished tooth. The material of which the tooth is made is soft enough when the mold is opened to mold these undercuts in and still remove the mold parts without damaging the ridge.

Having thus described my invention and the advantages thereof, I do not wish to be limited to the details herein disclosed, otherwise than as set forth in the claims, but what I claim is:

1. A method of making false teeth comprising molding teeth with ridges, the teeth being shorter than desired, in a pair of die parts, separating the die parts, applying enamel material to the short molded teeth, and then molding the enamel material on the teeth by means of a third die part having longer incisal portions and thereby making the teeth longer, the enamel covering the ridges.

2. A method of making false teeth comprising molding the teeth shorter than desired in a pair of die parts, separating the die parts, applying enamel material to the short molded teeth, and then molding the enamel material on the teeth by means of a third die part and thereby making the teeth longer, and molding undercut ridges on the shorter teeth prior to the application of the enamel.

MELVIN BUDISH.

REFERENCES CITED

The following references are of record in the file of this patent:

UNITED STATES PATENTS

| Number | Name | Date |
| --- | --- | --- |
| 1,181,975 | Dettinger | May 2, 1916 |
| 1,297,448 | Crate | Mar. 18, 1919 |
| 1,745,570 | Dimelow | Feb. 4, 1930 |
| 2,202,712 | Myerson | May 28, 1940 |
| 2,230,164 | Myerson | Jan. 28, 1941 |
| 2,345,305 | Thornton | Mar. 28, 1944 |
| 2,370,623 | Gibson, Jr. | Mar. 6, 1945 |